Aug. 4, 1925.
J. E. KENNEDY
1,548,470
SAFETY INDICATOR FOR PNEUMATIC TIRES
Filed June 24, 1922
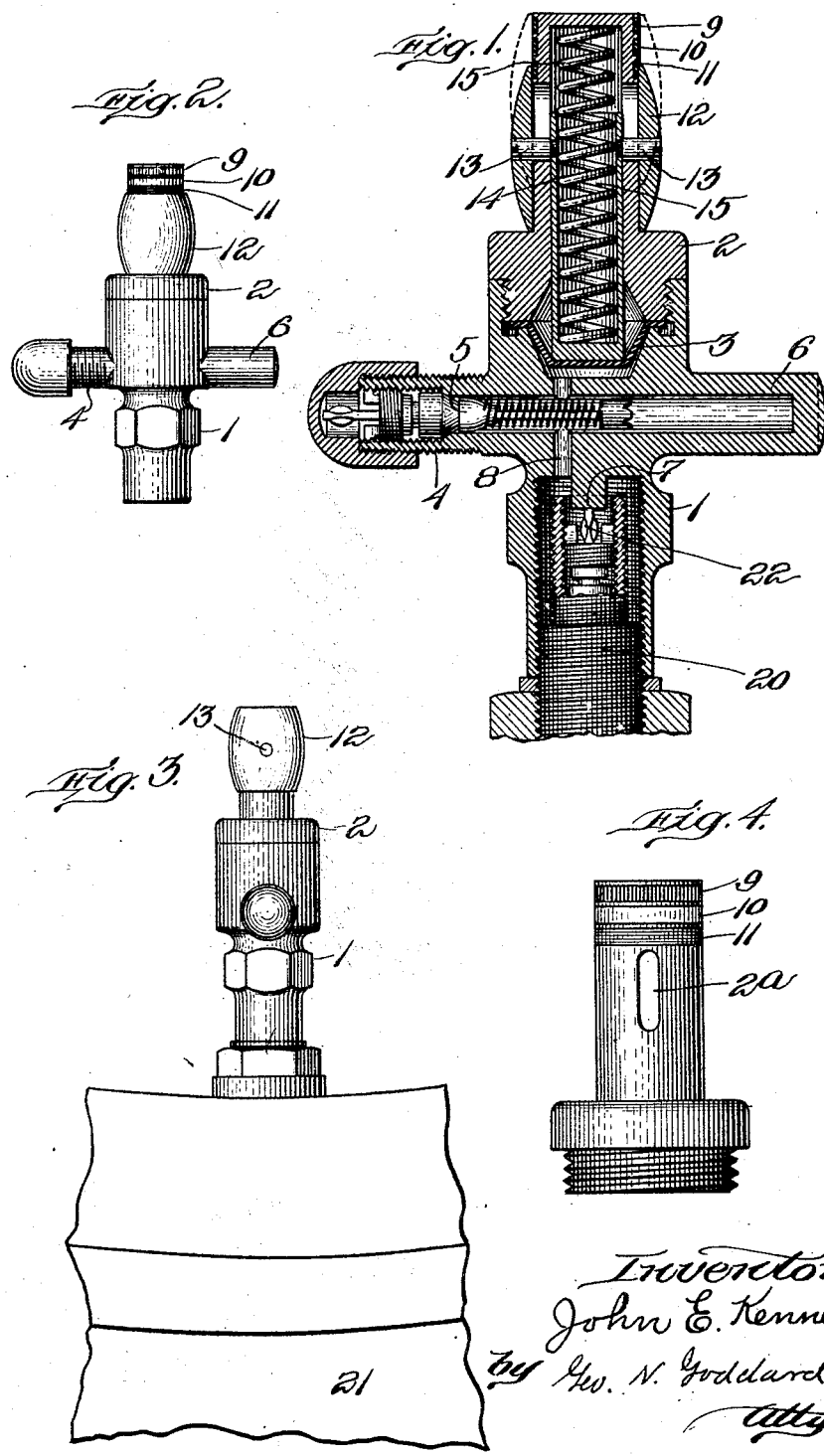

Patented Aug. 4, 1925.

1,548,470

UNITED STATES PATENT OFFICE.

JOHN E. KENNEDY, OF WEST PHILADELPHIA, PENNSYLVANIA.

SAFETY INDICATOR FOR PNEUMATIC TIRES.

Application filed June 24, 1922. Serial No. 570,661.

*To all whom it may concern:*

Be it known that I, JOHN E. KENNEDY, a British subject, and resident of West Philadelphia, in the county of Philadelphia and State of Pennsylvania, have invented certain new and useful Improvements in Safety Indicators for Pneumatic Tires, of which the following is a specification.

This invention relates to pneumatic tires and is intended to provide a simple, easily applied and reliable device of marked visibility for indicating a fall of pressure in the tire to the critical or danger point below which deflation will prove injurious to the tire.

Heretofore devices for indicating partial tire deflation have employed in some cases audible alarm designs to sound when the air pressure falls to a predetermined point and also a type carrying a gauge or pressure scale by which the exact pressure could be ascertained by reading the scale.

The difficulty of reading accurately the marks on a scale which are necessarily small and often stand upside down or at all sorts of angles of inclination, requires that a careful examination of each tire indicator be made in order to insure proper use and service of the device, and this motor car drivers generally are not disposed to bother with.

The present device comprises a simple and easily attached device which does not mar the appearance of the car wheels and yet one that enables the driver by a single glance at each tire stem, whatever its position, up or down, to ascertain whether any tire is approaching the danger point of deflation and how much margin or leeway the existing air pressure affords before reaching the danger point.

To this end the invention comprises a hollow casing adapted to be detachably and tightly secured to the tire and containing a movable piston arranged to oppose the air pressure in the tire by means of the thrust of a spring of definite or predetermined strength combined with an exterior casing surrounding sleeve or indicator connected with the piston and arranged to uncover successively a plurality of distinct or variegated bands on the casing as the tire pressure falls.

This and other features of the invention will be particularly described in the following specification and will be defined in the claims hereto annexed.

In the accompanying drawings I have illustrated a simple and effective construction embodying the principles of this invention, in which:

Figure 1 is a greatly enlarged central vertical sectional view of the device as applied to the tire stem of a motor car pneumatic tire.

Figure 2 is a side elevation of the device separate from the tire.

Figure 3 is an elevation at right angles to the plane of Figure 2 showing the relation to the hood rim and tire.

Figure 4 is an enlarged view of the upper section of the casing or body.

In the practice of this invention, according to the form illustrated in the drawings, I provide a casing comprising a lower attaching section 1, and an upper or indicating section 2 which may be tightly held together by screw threaded connection to pinch the edge of an elastic or flexible disk 3, which prevents the escape of air but which is responsive to the internal pressure of the air against its bottom.

The attaching or outer section 1, is provided at one side with a pumping nipple 4, provided with any suitable kind of check valve for preventing leakage of the contained air. On the opposite side to the nipple 5, is arranged a projecting boss 6, so that the two lateral arms afford a convenient gripping means or handle for tightly securing the device to the valve contained stem 20, of the tire 21, which is of the usual construction and also counterbalance each other.

The hollow outer end of the section 1 is provided with any suitable means, such as a depending boss or projection 7, arranged to engage the usual valve 22 carried by the tire valve stem so as to unseat the valve to maintain communication between the interior of the tire and the interior of the indicating device below the diaphragm 3, a vertical port or passage 8, being left to allow communication between the air-intake passage, the interior of the tire and the diaphragm-containing chamber or cavity formed by recesses in the opposed ends of the two tire casing sections.

The inner section 2, is extended radial inwardly of the tire in tubular form and at its inner end is provided with a plurality, in this case, three bands 9, 10, and 11 of different colors or contrasting appearance to serve as a visual indicator in connection with the sleeve or external indicator 12, which is slidably mounted on the outside of the tubular extension, and is connected by means of inwardly projecting pins or screws 13, with a hollow piston member 14, whose closed bottom seats upon the flexible diaphragm 3, and inside of which is placed a helical compression spring 15 of known or predetermined strength whose inner end thrusts against the closed inner end of the tubular section 2, and whose lower end exerts an endwise thrust against the bottom of the piston member 14 to oppose a yielding resistance to the compressed air on the opposite side of the diaphragm. The upper tubular section is provided with slots at 2ª to allow the connection pins 13, to move up and down the desired distance for accomplishing the purposes of the device.

Suppose that for a given size of tire and weight of car it be desired to maintain the air pressure of the tire at a normal pressure of 75 pounds, which is assumed to be practically 15 pounds above the partial deflation point at which continued use of the tire is likely to injure it. The strength of springs selected will be such that when the upper end of the sleeve 12, is in the dotted line position shown in Figure 1 flush with the upper end of the upper section of the casing, it will balance an air pressure of 75 pounds. The colored or distinctive bands 10 and 11 are made of sufficient width to indicate approximately a fall of 5 pounds pressure. Suppose, for example, the lowermost band is red, the middle white and the upper or inmost when on the top is blue, and that the ball sleeve indicator 12 is black or any other contrasting color. Obviously, a mere glance at the device without close observation indicates a normal pressure. If the blue band shows and the white band is still concealed the driver, with a hasty glance, will realize that he has lost about 5 pounds pressure but that he has a 10 pound margin over the danger point. If both bands are exposed to view he then knows instantly that he has only a 5 pound margin, while if the red band appears he at once realizes that the air pressure is close to the danger point and that the tire should be inflated.

There is nothing to get out of order and although the device is exceedingly simple and easy of application, by reason of the cross-arms affording a convenient means for manipulation, leakage is practically impossible if the two sections are tightly screwed together upon the interposed diaphragm.

The distinctive bands are made of substantial width and of contrasting appearance so as to make them readily visible at a distance without requiring close inspection. The external sleeve is preferably made of sufficient length to cover the slots in the piston tube so as to keep out dust and grit.

The same device may be used on different tires normally requiring different degrees of air pressure either by substituting a thrust spring of different strength corresponding to the pressure desired the replacement being easy of manipulation with this construction, or within limits a different length of sleeve may be substituted so as to cause the upper or inner end of the sleeve to register at normal position at a different pressure of the tire, the sleeve being detachably secured by the screw pins 13 to enable such change to be made. At a higher pressure a shorter sleeve will just cover the indicator bands while at a lower pressure a longer sleeve will do likewise.

The flexible diaphragm is a positive preventive of leakage when properly clamped between the two sections of the casing, and the construction and arrangement is such that there is no practical likelihood of its getting out of order.

It will be seen that the device is adapted to be normally carried in a position radial to the wheel center while the lateral air-supply nipple and the counterbalancing boss serve to preserve equilibrium and prevent bringing undue lateral strain on the supporting tire stem. Moreover, the entire radial casing is comprised of two integral members detachably locked together in such a position as to practically exclude dust from the interior since the outer end of the attaching member is coupled tightly to the valve stem, while the inner end of the inward member is closed by an integral end wall, and the lateral slots are covered by the slidable external indicator sleeve.

It will be understood that the term "outer" and "inner" as applied to the two members of the casing has reference to the center of the wheel or tire.

What I claim is:

1. A safety indicator for pneumatic tires embracing in its construction a hollow casing comprising a tire attaching section and a tubular indicator section forming, when coupled together, an air tight chamber, a flexible diaphragm extended across said chamber, a piston slidably mounted in the indicator section and normally pressed against said diaphragm by a spring of predetermined strength, an exterior sleeve slidably mounted on the exterior of said tubular section and connected with said piston to move therewith, said tubular section being provided with a series of distinctive bands arranged to be normally covered by said sleeve when the air pressure stands at a predetermined point, whereby the fall of air pressure leads to successively uncovering to view one after another of the indicating bands to indicate plainly the approach to the danger point of deflation, substantially as described.

2. A visual safety indicator for pneumatic wheel tires, embracing a symmetrically balanced tubular casing comprising an outer attaching member and an inner piston chamber, both arranged to form an inward radial extension of the tire stem when secured thereto and to have communication with the interior of the tire, the attaching member having a lateral tubular valved inlet projecting from one side, and a balancing arm on the other side, the inner end of the piston chamber being provided with encircling bands of contrasting color, and of substantial width to be visible at a distance and an exterior sleeve movable radially of the wheel along said piston chamber, according to the pressure of air in the tire, said sleeve being arranged to cover said bands at full tire pressure and to uncover one or more of said bands according to the drop in tire pressure, substantially as described.

3. A visual safety indicator for pneumatic tires embracing in its construction, a hollow casing adapted for permanent attachment to the stem of a pneumatic tire by an air-tight connection permitting its removal, said casing being provided with a lateral valved air inlet passage and having connection with the interior of the tire through said tire stem, a radially disposed inwardly projecting tubular member forming an inward extension of said casing and provided with a conspicuous band encircling its end, a slidable external sleeve open at both ends and arranged to surround and conceal said band at a predetermined pressure of the air, said sleeve being connected with an inwardly disposed air-actuated member whose position is controlled according to the air pressure in the tire to retract said external sleeve from band-concealing position to uncover said band when the tire pressure approaches the danger point, said sleeve and said band being of conspicuously contrasting appearance to render clearly noticeable at a distance, without close inspection, the approach of the air pressure in the tire to the danger point, substantially as described.

4. A safety indicator for pneumatic tires embracing in its construction a hollow casing adapted to be tightly secured to the valve stem of a tire, and provided with a valved intake for inflating the tire, said casing having a tubular extension provided with an external indicator band of appearance and width to render it conspicuous at a distance, an air actuated piston mounted inside said tubular extension to move against the pressure of a thrust spring and an external sleeve of contrasting appearance to the external band detachably connected with the piston by connecting means extending through longitudinal slots in the tubular member, said sleeve being located to cover the band at a predetermined pressure of air in the tire and to uncover it to view as the pressure falls, substantially as described.

5. A safety indicator for pneumatic tires embracing in combination a casing adapted to be tightly secured to the valve stem of a tire and provided with a tubular indicator member provided with an external multicolor band of substantial width, said tube being longitudinally slotted, an external sleeve mounted on said tube, an internal pressure actuated piston connected with said sleeve through the slotted tube and acting to position the sleeve to cover or to uncover the indicating band according to the pressure of air in the tire, said sleeve contrasting in appearance to the band to render the band conspicuously visible as the tire pressure falls, substantially as described.

6. A visual safety indicator for pneumatic tires embracing in its construction a tire-attaching member adapted to be tightly secured to the tire stem to project radially therefrom, an inwardly extending tubular piston chamber forming a radially disposed extension tightly secured thereto and having its inner end closed by an integral imperforated end wall, said tubular member being provided exteriorly with conspicuous contrasting bands of substantial width, a slidable external sleeve surrounding said tubular member in position to cover said bands when the tire pressure is at a predetermined point, and an interior air-controlled spring-pressed piston having direct connection with said sleeve through lateral slots in said tubular member in order to shift said sleeve radially to different positions to uncover one or more of said bands in conformity with the face of air pressure in the tire, substantially as described.

In witness whereof, I have subscribed the above specification.

JOHN E. KENNEDY.